R. R. BOWERS & L. R. CLAUSEN.
SWEEP RAKE.
APPLICATION FILED MAY 13, 1916.
1,287,201.
Patented Dec. 10, 1918.
3 SHEETS—SHEET 3.
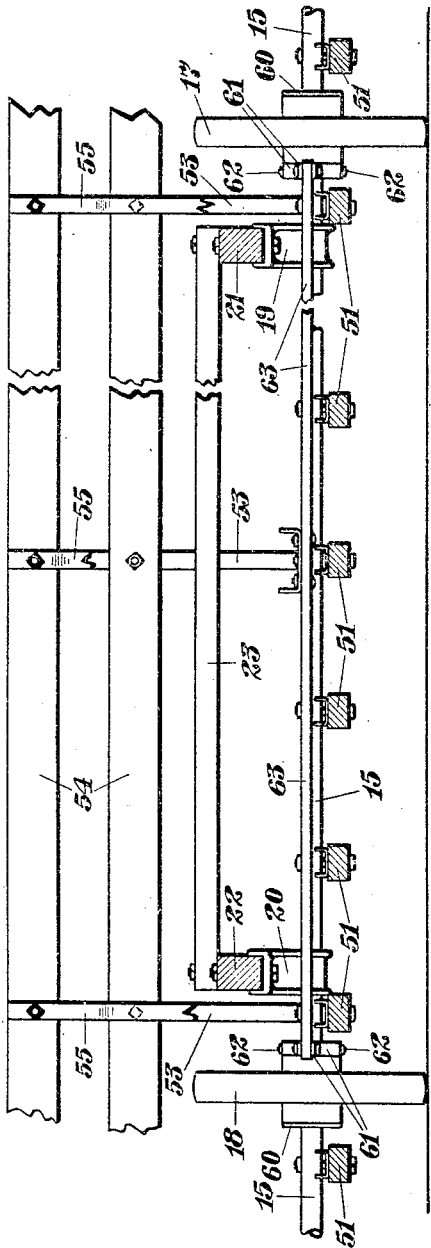
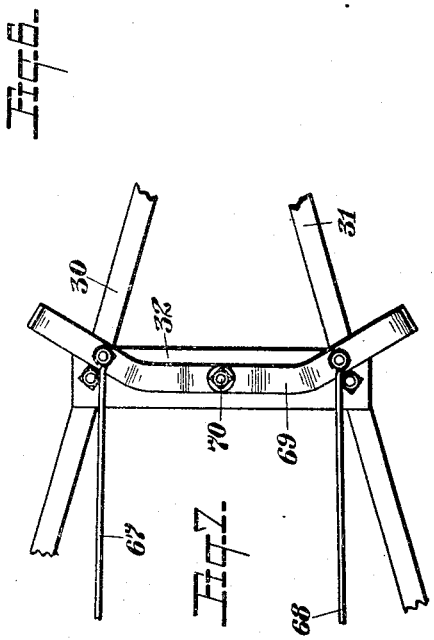

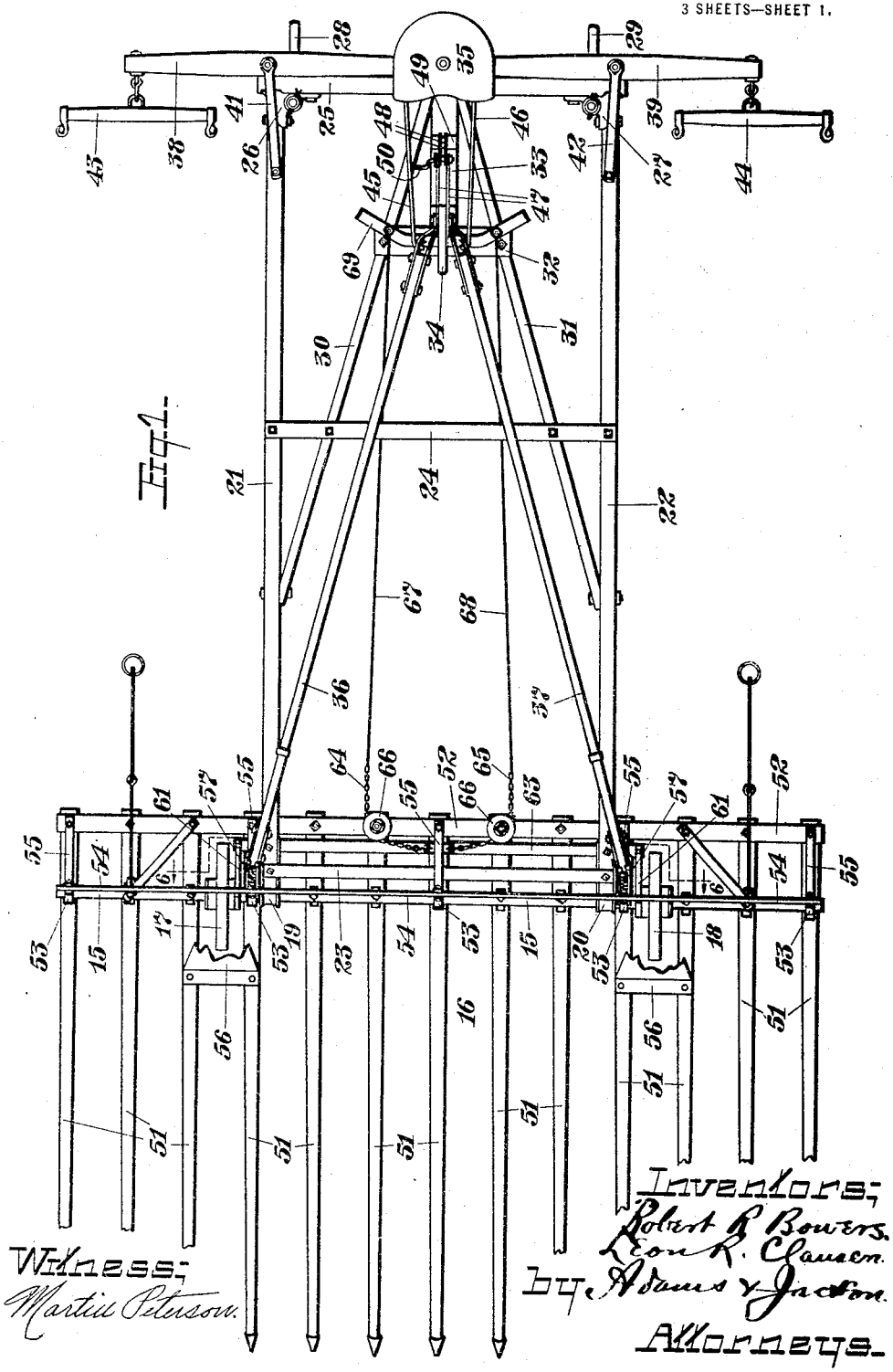

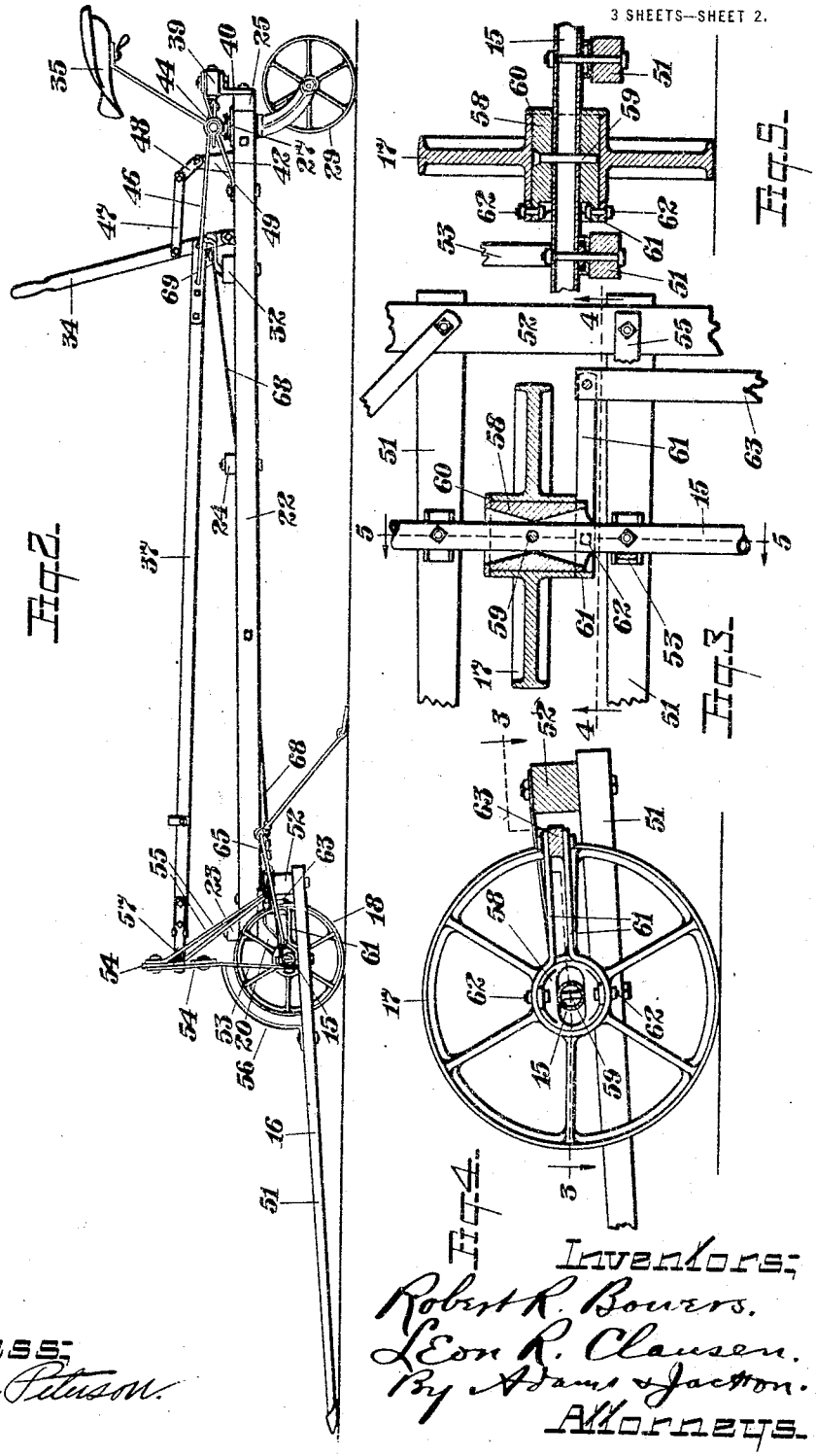

UNITED STATES PATENT OFFICE.

ROBERT R. BOWERS AND LEON R. CLAUSEN, OF OTTUMWA, IOWA, ASSIGNORS TO DAIN MANUFACTURING COMPANY OF IOWA, OF OTTUMWA, IOWA, A CORPORATION OF IOWA.

SWEEP-RAKE.

1,287,201.

Specification of Letters Patent.

Patented Dec. 10, 1918.

Application filed May 13, 1916. Serial No. 97,270.

*To all whom it may concern:*

Be it known that we, ROBERT R. BOWERS and LEON R. CLAUSEN, citizens of the United States, and residents of Ottumwa, in the county of Wapello, State of Iowa, have invented certain new and useful Improvements in Sweep-Rakes, of which the following is a specification, reference being had to the accompanying drawings.

Our invention relates to sweep rakes, or push rakes as they are sometimes called, and it has for its principal object the provision of a new and improved construction and arrangement by which the rake shall be more easily guidable for following the irregularities of the swath or windrow which is being gathered up, and for properly manipulating the rake at the corners of the field. In the form of rake heretofore used comprising caster-wheels at the rear free to turn under the influence of the draft animals, the rake has been slow to respond to the guiding influence and has required a considerable area for turning. In the form of rake heretofore used in which the rear wheels have been provided with means by which the operator can turn them laterally, the guiding has been accomplished by moving the rear end of the rake laterally in the direction opposite to that in which it is desired to have the front end of the rake moved. In this construction also the response of the rake to the guiding influence has been comparatively slow and unsatisfactory. It is the object of our invention to provide an arrangement by which the rake shall be made as responsive as possible to the efforts of the operator to guide the rake, this being accomplished by making the rear end of the rake guidable through the action of the draft animals and by making the front wheels guidable through the medium of levers to be moved by the operator. It is another object of our invention to improve rakes of this type in sundry details hereinafter pointed out. The preferred means by which we have accomplished our several objects are illustrated in the accompanying drawings and are hereinafter specifically described. That which we believe to be new and desire to cover by this application is set forth in the claims.

In the drawings:—

Figure 1 is a top or plan view of a rake embodying our improved construction;

Fig. 2 is a side view of the rake shown in Fig. 1;

Fig. 3 is an enlarged detail, being a fragmentary view partly in section illustrating the mounting of one of the front wheels of the rake, being substantially a horizontal section taken on line 3—3 of Fig. 4;

Fig. 4 is an enlarged detail, being substantially a section taken on line 4—4 of Fig. 3;

Fig. 5 is an enlarged detail, being substantially a section taken on line 5—5 of Fig. 3;

Fig. 6 is a vertical sectional view, being taken substantially on line 6—6 of Fig. 1; and Fig. 7 is a fragmentary view, being an enlarged detail illustrating the arrangement and construction of the foot-lever by which the front wheels are adapted to be turned laterally for guiding the machine.

Referring to the several figures of the drawings in which corresponding parts are indicated by the same reference characters,—

15 indicates a transversely-extending axle upon which a rake-head 16 is pivotally mounted as hereinafter described. Supporting wheels 17—18 are journaled upon the axle 15, as hereinafter described, for supporting the rake-head 16 and for guiding the same. Heavy brackets 19—20 are journaled upon the shaft 15, serving to support the front end of the main frame of the implement, such frame comprising longitudinally-extending bars 21—22 connected with the brackets 19—20, respectively, and transversely-extending frame-bars 23, 24 and 25. The transverse frame-bar 25 is connected with the longitudinally-extending bars 21—22 of the main frame by means of heavy corner brackets 26—27 (see Fig. 1) which also serve as means for connecting caster-wheels 28—29, respectively, to the rear end of the main frame, the caster-wheels 28—29 being of any approved type adapted to turn laterally relative to the frame. Substantially the form of construction so far described is shown in patent to Joseph Dain, No. 974,125, of November 1, 1910, except for the adaptability of the wheels 17—18 for guiding the rake.

Diagonally-extending frame-bars 30—31 are connected at their forward ends to the longitudinally-extending bars 21—22, respectively, and have a suitable connection at their rear ends (not shown) with the transverse frame-bar 25. A short transversely-extending frame-bar 32 is supported in fixed position by the diagonally-extending bars 30—31, and a short longitudinally-extending bar 33 connects the middle point of the bar 32 with the rear frame-bar 25. A lever 34 is pivotally mounted upon the bar 33 in position to be conveniently reached by an operator upon a seat 35 suitably supported from the framework. Forwardly-extending bars or links 36—37 are pivotally connected at their rear ends with the lever 34 and are pivotally connected at their forward ends with the rake-head 16 above the axis 15, as hereinafter more specifically described, whereby a backward pull upon the links 36—37 serves to turn the rake-head 16 in a clock-wise direction in Fig. 2 for raising the forward ends of the teeth of the rake-head. The members 38—39 of a two-part double-tree are pivotally mounted upon brackets 40 carried by the ends of the transverse bar 25, being braced in position by brace-bars 41—42, respectively. The outer ends of the members 38—39 of the double-tree are provided with swingletrees 43—44, while the inner ends of such members are pivotally connected to forwardly-extending links 45—46, respectively, which are pivotally connected at their forward ends with the links or bars 36—37, respectively. By reason of this construction, the draft of the team serves to raise the points of the rake-teeth in the well-known manner. Links 47—48 are pivotally connected, respectively, with the lever 34 and with a bracket 49 rising from the bar 33, being pivotally connected together at their adjacent ends, and supporting a stirrup 50 by means of which the operator is enabled to apply foot pressure to the lever 34, as will be readily understood, for pushing the lever forward for lowering the forward ends of the rake-teeth. The links 47—48 are also adapted to swing backward, upon the backward movement of the lever 34, into a past-center locking position for holding the forward ends of the rake-teeth in raised position for the transportation of the rake.

The rake-head 16 comprises a plurality of teeth 51 fixed upon the shaft 15, the teeth being preferably secured in position by means of bolts passing through the teeth and through the axle. The rear ends of the teeth are secured together by means of a transversely-extending bar 52. A plurality of bars or straps 53 rising from the axle 15 and rigidly connected therewith carry in position above the axle a plurality of cross-bars 54 which serve to limit the rearward movement of the hay upon the rake-teeth. These bars are braced in position by means of diagonally-extending braces 55 which are connected at their lower ends to the transversely-extending bar 52. Shields 56 protect the wheels 17—18 from the hay piled upon the teeth 51 adjacent to the cross-bars 54. The connection of the links or bars 36—37 with the rake-head is effected by means of spring-coupling devices 57 of any suitable type serving to connect the forward ends of said links with bars 53 and 54 at opposite sides of the rake-head. The spring coupling devices are of the type shown in the Dain patent above referred to, serving to hold the rake-teeth 51 yieldingly down upon the ground. It is believed to be unnecessary to describe these couplings in detail herein, inasmuch as they form no part of our present invention.

Each of the wheels 17—18 is journaled upon a bearing-block 58 (see Fig. 3) which is held against rotation independently of the axle 15 but is adapted to swing horizontally about the pivot-pin 59 by which it is secured to the axle. The bearing-block 58 is provided at one end with a flange 60 against which the hub of the wheel 17 or 18 is adapted to bear, the wheel being held against withdrawal from the bearing-block by means of a yoke 61 extending about the bearing-block 58 and secured thereto by means of bolts 62. The rearwardly-extending arms of the yoke 61 are pivotally secured to a transversely-extending bar 63. As will be readily understood, upon a lateral swinging of the rearwardly-extending arms of the yokes 61, the wheels 17—18 are turned laterally upon the pivot-pins 59 for guiding the machine to one side or the other, the wheels 17—18 being of course held in parallelism by the bar 63. By reason of the fact that the pivot-pin 59 is located in the plane passing through the middle of the rim or tread portion of the wheel, the wheel has no tendency to change its angular position relative to the axle except as such a result is brought about by the uneven conformation of the ground over which the wheel runs.

Means is provided for moving the bar 63 in either direction transversely of the machine. This means comprises flexible connectors 64—65 connected with the said bar and extending laterally of the machine from their point of connection with the bar to and about sheaves 66 journaled upon the bar 52 of the rake-head. Links 67—68 are connected with the portions of the chain 64—65, respectively, extending beyond the sheaves 66, such links being pivotally connected at their rear ends with a foot-lever 69 upon opposite sides of the centrally-located pivot pin 70 of said lever, as best shown in Fig. 7. As will be readily understood, when one end of the lever 69 is pushed forward by the operator, the link 67 or 68 connected to the opposite end of the lever is drawn backward, serving through the medium of the flexible connection 64 or 65 at that side of the machine to pull the bar 63 laterally toward that side of the machine, thus serving to turn the wheels 17—18 laterally for directing the rake-head toward the opposite side.

By reason of making the rear supporting wheels 28—29 in the form of caster-wheels so that the rear end of the rake can be controlled by the draft animals, and providing means by which the forward supporting wheels 17—18 may be turned laterally under the control of the operator, we have provided a construction which is very readily controlled either for turning purposes in close quarters or for following the irregularities of the swath or windrow being gathered up. So far as we are aware, we are the first in the art to provide for steering the front supporting wheels relative to the main frame of the rake, and our claims are to be construed accordingly.

What we claim as our invention and desire to secure by Letters Patent, is—

1. In a sweep-rake, the combination of a frame and a wheeled support therefor, comprising a transversely-extending axle member connected to said frame near the forward end thereof, and wheels mounted on said axle so as to have lateral movement relative to the axle, means for so turning the wheels for steering the machine, and a rake-head mounted on said axle and movable about an axis coincident with said axle.

2. A sweep-rake comprising a frame, a rake-head pivotally mounted on a horizontal axis at the forward portion of said frame, wheels journaled upon said rake-head on said horizontal axis, and means for turning said wheels laterally to steer the rake.

3. In a sweep-rake, the combination of a frame, a rake-head pivotally connected with said frame and extending forwardly therefrom and movable about a horizontal axis, a supporting wheel revolubly mounted on the same horizontal axis as the rake-head and movable laterally relative thereto, and means comprising a lever mounted on said frame for turning said wheel laterally in either direction relative to said frame.

4. In a sweep-rake, the combination of a frame, a rake-head pivotally connected with said frame near the forward end of such frame, and a supporting wheel mounted on said rake-head on a horizontal axis and movable laterally relative to said frame for guiding the rake.

5. In a sweep-rake, the combination of a main frame, wheels supporting said frame at the front and rear thereof, an axle extending transversely of said frame at the forward end thereof, means for connecting the front wheels to said axle to permit lateral turning of such wheels thereon for guiding purposes, a rake-head extending forwardly from said frame and movable up and down upon an axis coincident with said axle, means for so moving said rake-head, and other means for laterally turning said front wheels on said axle.

6. In a sweep-rake, the combination of a main frame, wheels supporting said frame at the front and rear thereof, an axle extending transversely of said frame at the forward end thereof, means for connecting the front wheels to said axle to permit lateral turning of such wheels thereon for guiding purposes, a rake-head extending forwardly from said frame and movable up and down upon an axis coincident with said axle, means for so moving said rake-head, and other means for laterally turning said front wheels on said axle, said last-named means comprising a laterally-extending bar connected with the front wheels in the rear thereof and means for moving said bar in either direction.

7. In a sweep-rake, the combination of a main frame, wheels supporting said frame at the front and rear thereof, an axle extending transversely of said frame at the forward end thereof, means for connecting the front wheels to said axle to permit lateral turning of such wheels thereon for guiding purposes, a rake-head extending forwardly from said main frame and movable up and down relative thereto, means for so moving said rake-head, and other means for laterally turning said front wheels, said last-named wheels comprising a laterally-extending bar located in rear of and connected with the front wheels and flexible connecting means attached to said bar and extending laterally in opposite directions.

8. In a sweep-rake, the combination of a main frame, wheels supporting said frame at the front and rear thereof, an axle extending transversely of said frame at the forward end thereof, means for connecting the front wheels to said axle to permit lateral turning of such wheels thereon for guiding purposes, a rake-head extending forwardly from said main frame and movable up and down relative thereto, means for so moving said rake-head, and other means for laterally turning said front wheels, said last-named means comprising a laterally-extending bar located in rear of and connected with the front wheels, flexible connecting means attached to said bar and extending in opposite directions, sheaves carried by said rake-head at opposite sides of the attachment of said connecting means to said bar, about which sheaves the said connecting means extend, and a lever mounted on the main frame for moving said flexible connecting means.

9. In a sweep-rake, the combination with a rake-head comprising a transverse bar and a series of rake-teeth projecting forwardly from said bar, of a transversely-extending axle connected with said teeth, wheels mounted on said axle and adapted to be laterally turned relative thereto, and means for laterally turning the wheels.

10. In a sweep-rake, the combination with a rake-head comprising a transverse bar and a series of rake-teeth projecting forwardly from said bar, of a transversely-extending axle connected with said teeth, wheels mounted on said axle and adapted to be laterally turned relative thereto, said wheels being connected together to compel a simultaneous lateral turning thereof, and means for so laterally turning such wheels.

11. In a sweep-rake, the combination with a series of spaced teeth, of a transversely-extending axle connected with said teeth near their rear ends, wheels mounted on said axle, means for connecting said wheels to the axle to permit lateral turning of the wheels for guiding purposes, and means for so turning such wheels.

12. In a sweep-rake, the combination with a series of spaced teeth, of a transversely-extending axle connected with said teeth near their rear ends, wheels mounted on said axle, means for connecting said wheels to the axle to permit lateral turning of the wheels for guiding purposes, parallel arms connected respectively with the wheels, a cross-bar pivotally connected to the outer ends of such arms, and means for laterally shifting said cross-bar to laterally turn the wheels.

ROBERT R. BOWERS.
LEON R. CLAUSEN.

Copies of this patent may be obtained for five cents each, by addressing the "Commissioner of Patents, Washington, D. C."